United States Patent [19]
Henderson

[11] Patent Number: 5,443,424
[45] Date of Patent: Aug. 22, 1995

[54] BELT TENSIONER AND METHOD OF MAKING THE SAME

[75] Inventor: Dewey D. Henderson, Springfield, Mo.

[73] Assignee: Dayco Products, Inc., Dayton, Ohio

[21] Appl. No.: 326,559

[22] Filed: Oct. 20, 1994

[51] Int. Cl.$^6$ .............................................. F16H 7/12
[52] U.S. Cl. ...................................................... 474/135
[58] Field of Search ............... 474/110, 115, 117, 133, 474/135

[56] References Cited

U.S. PATENT DOCUMENTS

| | | | |
|---|---|---|---|
| 4,596,538 | 6/1986 | Henderson | 474/135 |
| 4,886,483 | 12/1989 | Henderson | 474/135 |
| 4,952,197 | 8/1990 | Henderson | 474/135 |
| 5,035,679 | 7/1991 | Green et al. | 474/135 |
| 5,250,009 | 10/1993 | Sidwell et al. | 474/135 |
| 5,348,514 | 9/1994 | Foley | 474/135 |

Primary Examiner—Roger J. Schoeppel
Attorney, Agent, or Firm—Joseph V. Tassone

[57] ABSTRACT

A tensioner for a power transmission belt that is adapted to be operated in an endless path and method of making the same are provided, the tensioner including a one-piece support member for being fixed relative to the belt, and a belt engaging arm movably carried by the support member, the support member having a pivot opening passing therethrough and having an annular surface disposed substantially concentrically about the longitudinal axis of the pivot opening thereof, the belt engaging arm having a pivot part thereof rotatably disposed in the pivot opening so as to rotate therein, the support member being formed of polymeric material and the belt engaging arm having an annular surface directly disposed in sliding engagement with the annular surface of the support member.

20 Claims, 5 Drawing Sheets

BELT TENSIONER AND METHOD OF MAKING THE SAME

BACKGROUND OF THE INVENTION

1. Field of the Invention

This invention relates to a new tensioner for an endless power transmission belt or the like and to a new method of making such a tensioner.

2. Prior Art Statement

It is known to provide a tensioner for a power transmission belt that is adapted to be operated in an endless path, the tensioner comprising a one-piece support member for being fixed relative to the belt, a belt engaging arm movably carried by the support member, and mechanical spring means operatively interconnected to the support member and to the belt engaging arm for urging the belt engaging arm relative to the support member and against the belt with a force to tension the belt, the support member having a pivot opening passing therethrough and having an annular surface disposed substantially concentrically about the longitudinal axis of the pivot opening thereof, the belt engaging arm having a pivot part thereof rotatably disposed in the pivot opening so as to rotate therein, the support member being formed of metallic material and having polymeric bearing means disposed between the annular surface thereof and an annular surface of the belt engaging arm that is disposed in sliding engagement with the polymeric bearing means. For example, see the U.S. patent to Henderson, No. 4,952,197 and the U.S. patent to Henderson, U.S. Pat. No. 4,596,538.

SUMMARY OF THE INVENTION

It is one of the features of this invention to provide a new belt tensioner which has fewer parts than a prior known similar belt tensioner.

In particular, it is believed according to the teachings of this invention that the one-piece support member of the prior known belt tensioner can be made of polymeric material and thereby eliminate the need for polymeric bushings when the belt engaging arm is pivotly mounted thereto.

For example, one embodiment of this invention comprises a tensioner for a power transmission belt that is adapted to be operated in an endless path, the tensioner comprising a one-piece support member for being fixed relative to the belt, a belt engaging arm movably carried by the support member, and mechanical spring means operatively interconnected to the support member and to the belt engaging arm for urging the belt engaging arm relative to the support member and against the belt with a force to tension the belt, the support member having a pivot opening passing therethrough having an annular surface disposed substantially concentrically about the longitudinal axis of the pivot opening thereof, the belt engaging arm having a pivot part thereof rotatably disposed in the pivot opening so as to rotate therein, the support member being formed of polymeric material, the belt engaging arm having an annular surface directly disposed in sliding engagement with the annular surface of the support member.

Accordingly, it is an object of this invention to provide a new tensioner for a power transmission belt that is adapted to be operated in an endless path, the tensioner of this invention having one or more of the novel features of this invention as set forth above or hereinafter shown or described.

Another object of this invention is to provide a new method of making such a tensioner, the method of this invention having one or more of the novel features of this invention as set forth above or hereinafter shown or described.

Another object of this invention is to provide a new part for such a tensioner, the new part of this invention having one or more of the novel features of this invention as set forth above or hereinafter shown or described.

Another object of this invention is to provide a new method of making such a new part, the method of this invention having one of more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangements as desired.

Therefore, this invention is not to be limited to only the embodiments illustrated in the drawings, because the drawings are merely utilized to illustrate one of the wide variety of uses of this invention.

Figure 1:
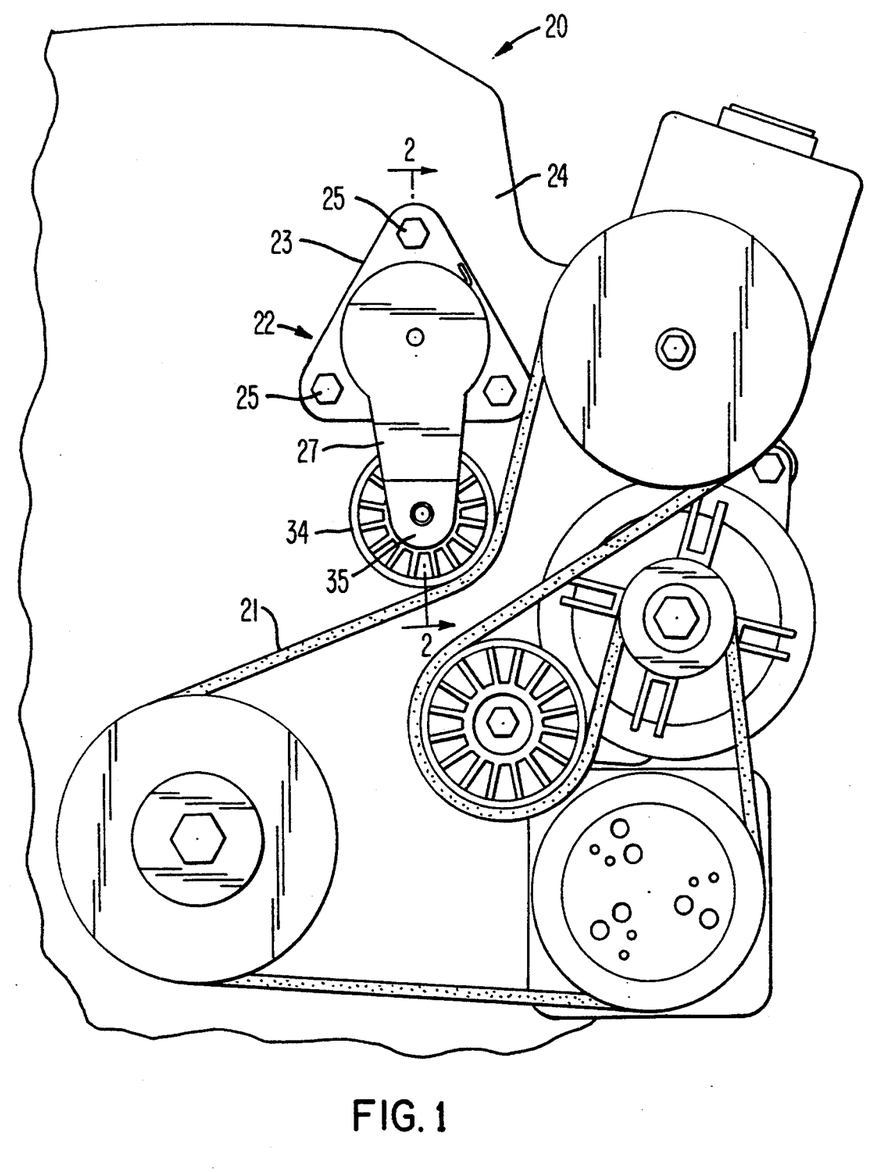
FIG. 1 is a view looking toward the front end of an automobile engine which utilizes the new belt tensioner of this invention.

Referring now to FIG. 1, an automobile engine is generally indicated by the reference numeral 20 and utilizes an endless power transmission belt 21 for driving a plurality of driven accessories as is well known in the art, the new belt tensioner of this invention being generally indicated the reference numeral 22 and being utilized to provide a tensioning force on the belt 21 in a manner hereinafter set forth.

The endless power transmission belt 21 may be of any suitable type known in the art and is preferably made primarily of polymeric material because the unique features of the tensioner 22 of this invention readily permit the tensioner 22 to tension a belt having a load carrying cord in an effective manner as fully set forth in the aforementioned U.S. patent to Henderson, U.S. Pat. No. 4,596,538 whereby this U.S. patent is being incorporated into this disclosure by this reference thereto.

Also, because many of the parts of the belt tensioner 22 of this invention and the details of the operation thereof are fully described and illustrated in the other aforementioned U.S. patent to Henderson, No. U.S. Pat. No. 4,952,197, this U.S. patent is also being incorporated into this disclosure by this reference thereto whereby a further discussion of the engine 21 and the operation of the tensioner 22 on the belt 21 is deemed unnecessary.

Figure 2:
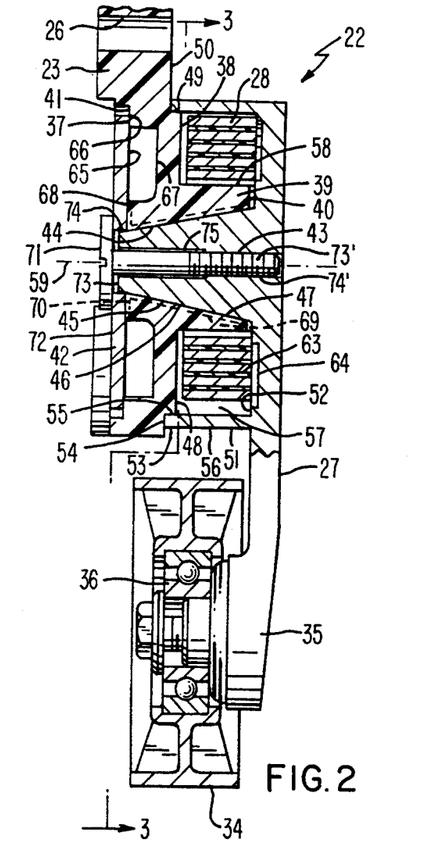
FIG. 2 is an enlarged fragmentary cross-sectional view of just the new belt tensioner of this invention and is taken in the direction of the arrows 2—2 of FIG. 1.
Figure 3:
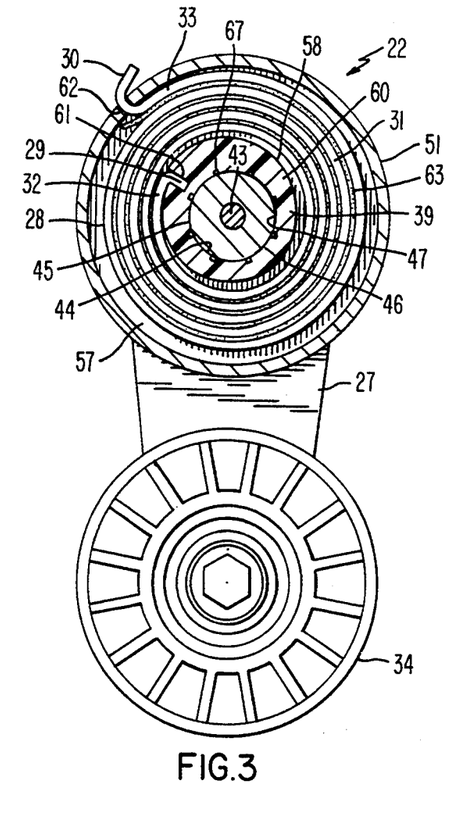
FIG. 3 is a cross-sectional view taken on line 3—3 of FIG. 2.
Figure 4:
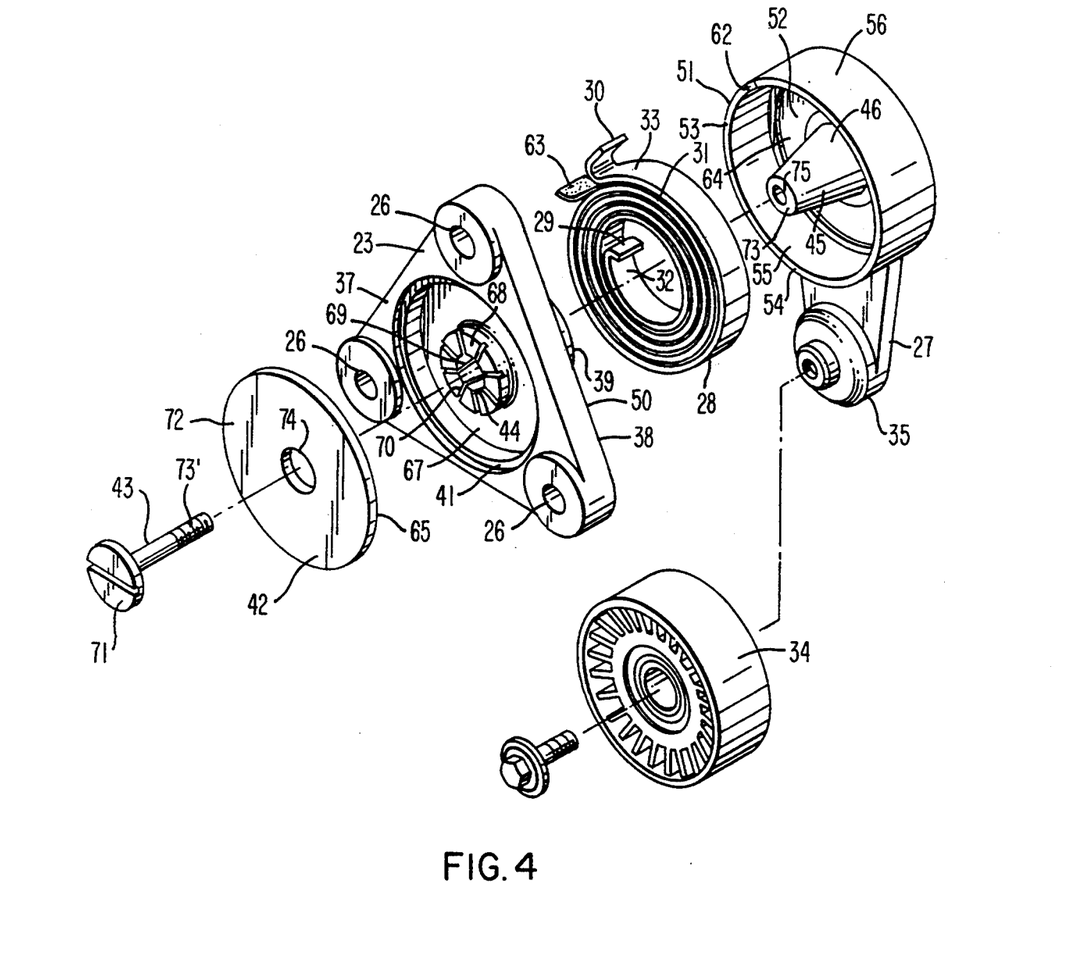
FIG. 4 is an exploded perspective view of the various parts that form the new belt tensioner of FIGS. 1-3.

As best illustrated in FIGS. 2–4, the new belt tensioner 22 of this invention comprises a one-piece support member 23 formed of any suitable polymeric material, such as a polymeric material sold under the trademark ZYTEL by the DuPont Corporation of Wilmington, Del., and then being filled with 33% fiberglass, and being adapted to be fixed to a mounting bracket or support structure 24 of the engine 20 by a plurality of fastening means 25 extending through suitable mounting openings 26 in the support member 23 as illustrated in FIGS. 1 and 2.

A belt engaging arm 27 is movably carried by the support member 23 in a manner hereinafter set forth and is die cast of any suitable metallic material, such as aluminum material.

The tensioner 22 has a mechanical spring means 28 provided with an inner end 29 that is operatively interconnected to the support member 23 in a manner hereinafter set forth and an outer end 30 that is operatively interconnected to the belt engaging arm 27 in a manner hereinafter set forth, the spring means 28 comprising a substantially flat metallic member wound in a spiral manner to define spirals or coils 31 thereof whereby an inner spiral 32 is disposed adjacent the inner end 29 and an outer spiral 33 is disposed adjacent the outer end 30 as illustrated in FIG. 3.

The spring means 28 has been wound up in such a manner that when the spring means 28 is disposed in the tensioner 22 of this invention in a manner hereinafter set forth, the spring means 28 urges a belt engaging pulley means 34 of the belt engaging arm 27 against the belt 21 to tension the same in a manner fully set forth the aforementioned two U.S. patents to Henderson, the belt engaging pulley means 34 being rotatably mounted to an end 35 of the arm 27 by suitable bearing means 36 in a manner well known in the art.

The support member 23 has opposed sides 37 and 38 with a spring engaging hub-like part 39 extending from the side 38 thereof and being provided with a free end 40, the side 37 of the support member 23 having a circular recess 41 formed therein for receiving an arm plate 42 that is attached to the belt engaging arm 27 in any suitable manner, such as by flats, knurls or teeth. A fastening member 43 illustrated in FIGS. 2–4 retains the plate 42 in positive engagement with the belt engaging arm 27 in a manner hereinafter set forth.

A substantially frusto-conical pivot opening means 44 passes through the free end 40 of the hub like part 39 of the support member 23 and also extends through the side 37 of the support member 23 to rotatably receive a cooperating frusto-conical pivot shaft or part 45 of the arm 27 so that the arm 27 will be pivotly or rotatably mounted to the support member 23 as the part 45 of the arm 27 has an external peripheral surface means 46 that cooperates with an internal peripheral surface means 47 of the support member 23 that is defined by the opening 44 thereof.

The side 38 of the support member 23 has a cylindrical part 48 extending outwardly therefrom and joining the hub-like part 39 as illustrated in FIG. 2, the cylindrical part 48 defining an annular shoulder or surface means 49 that is disposed substantially at a right angle relative to an outer and adjacent flat annular surface means 50 of the side 38 as illustrated in FIG. 2.

The belt engaging arm 27 has a cup-shaped portion 51 that is provided with a closed end 52 and an open end 53 that terminates in a substantially flat annular surface means 54 that directly engages against the flat annular surface means 50 of the support member 23 to slide thereagainst during pivoting movement of the arm 27 relative to the support member 23 as will be apparent hereinafter.

If desired, the open end 53 of the cup-shaped portion 51 of the belt engaging arm 27 can have an internal peripheral surface means 55 thereof also disposed in sliding engagement with the annular shoulder or surface means 49 of the cylindrical part 48 of the support member 53 at the same time that the end surface means 54 thereof is disposed in sliding engagement with the annular surface means 50 of the support member 53.

The cup-shaped portion 51 of the belt engaging arm 27 has an annular section 56 interconnecting the closed end 52 thereof to the open end 53 thereof and cooperates with the hub-like part 39 of the support member 23 to define a spring containing chamber means 57 in the tensioner 22 when the arm 27 has been assembled to the support member 23 in a manner hereinafter set forth whereby the chamber means 57 is substantially sealed from the exterior of the tensioner 22 by the cooperating annular surface means 50 and 54 of the support member 23 and belt engaging arm 27.

The hub-like part 39 of the support member 23 has an external peripheral surface means 58 that is disposed off center relative to one side of the longitudinal axis 59 of the pivot opening 44 of the support member 23 as best illustrated in FIG. 3 so as to define material 60 that readily supports the inner coil or spiral 32 of the spring 28 when the inner end 29 thereof is received in an annular slot 61 in the hub like part 39 as illustrated in FIG. 3 to thereby tend to prevent breaking of the inner coil 32 of the spring 28 relative to the bent end 29 thereof all for the reasons fully set forth in the aforementioned U.S. patent to Henderson, U.S. Pat. No. 4,596,538. In this manner, the inner end 29 of the spring 28 is interconnected to the support member 23.

The annular section 56 of the cup-shaped part 51 of the belt engaging arm 27 has an opening 62 passing therethrough and through which the outer end 30 of the spring 28 is disposed in a hooking manner as illustrated in FIG. 3 so as to interconnect the outer coil 33 of the spring 28 to the belt engaging arm 27 also in a manner well known from the U.S. patent to Henderson, U.S. Pat. No. 4,596,538.

If desired, a suitable polymeric anti-friction tape 63 can be disposed between the coils 31 of the spring 28 as is also well known in the art.

In order to reduce friction between the coils 31 of the spring 28 and the closed end wall 52 of the cup-shaped section 51 of the belt engaging arm 27, the closed end 52 thereof can be provided with an annular recess 64 therein. Similarly, in order to reduce contact area between a facing side 65 of the arm plate 42 and a closed end 66 of the annular recess 41 in the side 37 of the support member 23, an annular recess 67 can be provided in the surface 66 as illustrated in the drawing whereby an annular surface 68 of the closed end 66 of the recess 41 of the support member 23 is adapted to be disposed in contact with the side 65 of the arm plate 42 adjacent the pivot opening 44 thereof as illustrated.

In order to facilitate sliding movement between the external peripheral surface means 46 of the pivot part 45 of the belt engaging arm 27 and the internal peripheral surface means 47 of the support member 23, a plurality of spaced apart longitudinal grooves 69 are formed in the surface means 47 of the support member 23 to contain grease or any other suitable lubricant. Similarly, the annular surface means 68 of the support member 23 is provided with a plurality of radially disposed grooves 70 for containing grease or other suitable lubricant to facilitate the sliding movement between the surface means 68 and the side 65 of the arm plate 42. If desired, the grooves 70 can be in aligned relation with the grooves 69 as illustrated.

When it is desired to assemble the belt engaging arm 27 to the support member 23, the fastening member 43 is adapted to have an enlarged head 71 thereof compacted against a side 72 of the arm plate 42 in the manner illustrated in FIG. 2 while a threaded shank 73' of the fastening member 43 cooperates with internal threads 74' in a longitudinal opening 75 formed through the pivot part 45 of the arm 27 so as to also compact the annular surface means 54 thereof into contact with the annular surface means 50 of the support member 23 with a certain force.

Thus, the fastening member 43 holds the surface means 65 of the arm plate 42 into contact with the annular surface means 68 of the support member 23 as well as the annular surface means 54 of the belt engaging arm 27 against the annular surface means 50 of the support member 23 when the fastening member 43 fastens the arm plate 42 to the belt engaging arm 27 as illustrated in the drawings. Under such assembled conditions of the belt engaging arm 27 with the support member 23, it can be seen that the free end 40 of the hub-like part 39 of the support member 23 is in spaced relation from the closed end 52 of the cup-shaped section 51 of the belt engaging arm 27. However, if desired, contact can be provided therewith as the properties of the plastic material of the support member 23 are such that the same provides anti-friction surface means with the contacting parts of the belt engaging means 27 and the arm plate 42 during rotatable or pivoting movement of the belt engaging arm 27 and the arm plate 42 relative to the fixed support member 23 during the operation of the tensioner 22 all in the manner fully set forth in the aforementioned U.S. patents to Henderson.

Thus, it is believed that the belt tensioner 22 of this invention eliminates the need of anti-friction bushings between the sliding parts of the belt engaging arm 27 and the arm plate 42 thereof with the cooperating surfaces of the support member 23 as the support member 23 itself provides the anti-friction material.

Accordingly, it can be seen that the support member 23 of this invention can be formed in a simple manner by molding suitable plastic material into the configuration illustrated in the drawings for the purpose previously set forth.

While the tensioner 22 has been illustrated and described as utilizing a threaded fastening member 43 for securing the arm plate 42 to the belt engaging arm 27 during the assembling of the tensioner 22, it is to be understood that other types of fastening means can be utilized, such as the fastening means illustrated and described in the aforementioned U.S. patents to Henderson.

In addition, such fastening arrangement can be provided by staking over the free end 73 of the pivot part 45 of the belt engaging arm 27 against the side 72 of the arm plate 42 if the pivot part 45 is formed long enough to completely project through the opening 74 in the arm plate 42 a sufficient distance for such purpose.

Figure 5:
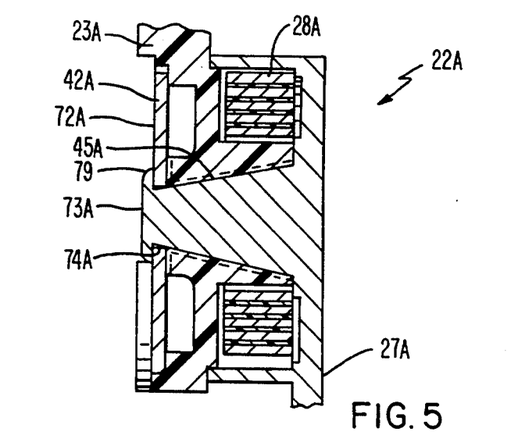
FIG. 5 is a fragmentary view similar to FIG. 2 and illustrates another belt tensioner of this invention.

For example, such a tensioner of this invention is generally indicated by the reference numeral 22A in FIG. 5 and parts thereof that are similar to parts of the tensioner 22 previously described are indicated by like reference numerals followed by the reference letter "A".

As illustrated in FIG. 5, the free end 73A of the pivot part 45A of the belt engaging arm 27A of the tensioner 22A extends through the opening 74A in the arm plate 42A a sufficient distance so that the same is adapted to be swedged or turned over in the area of the reference numeral 79 to compact against the side 72A of the arm plate 42A for the same purpose as the enlarged head 71 of the fastening member 43 previously described.

Therefore, it can be seen that the degree of compacting the cooperating surfaces of the support member and belt engaging arm of either of the tensioners 22 and 22A of this invention previously described controls the amount of frictional resistance between the moving parts thereof and, therefore, acts in a manner similar to a means for dampening the pivoting movement of the belt engaging arm relative to the support member as provided by separate dampening means that are utilized in the tensioners of the aforementioned U.S. patents to Henderson.

However, if desired, the tensioners of this invention can also utilize such separate frictional dampening means if desired.

Figure 6:
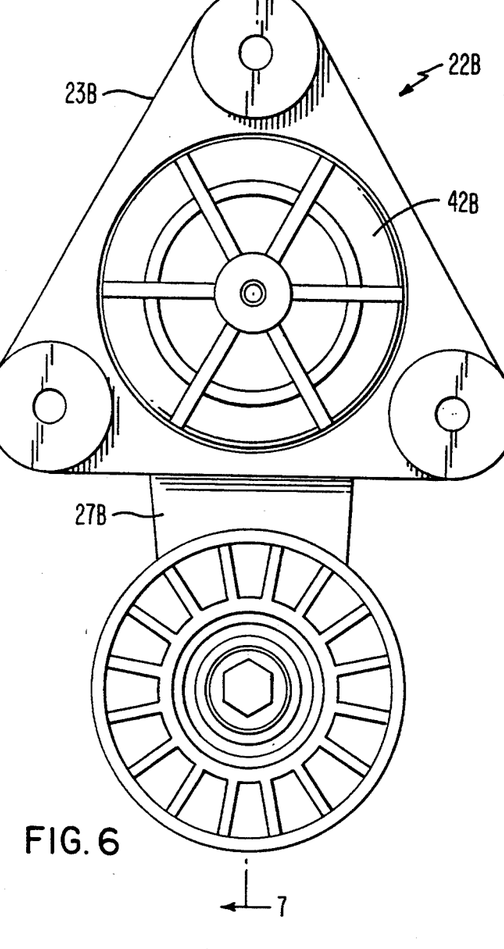
FIG. 6 is a rear view of another belt tensioner of this invention.
Figure 7:
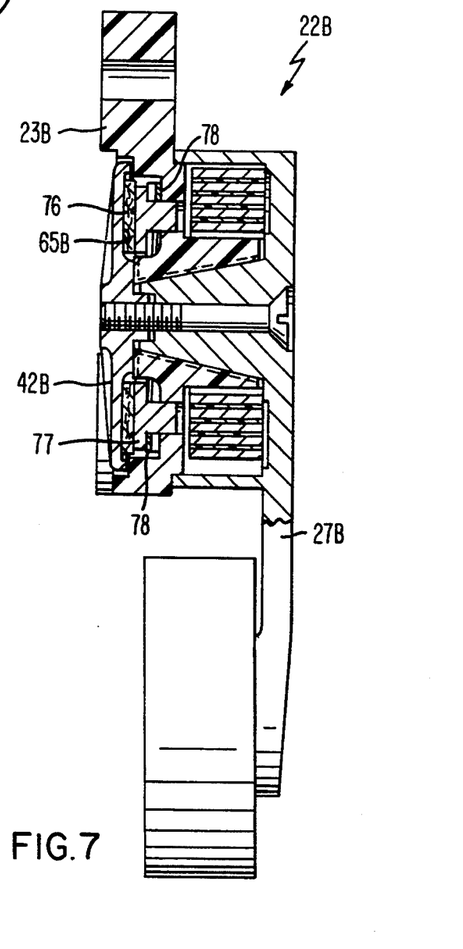
FIG. 7 is a cross-sectional view taken on lines 7—7 of FIG. 6.
Figure 8:
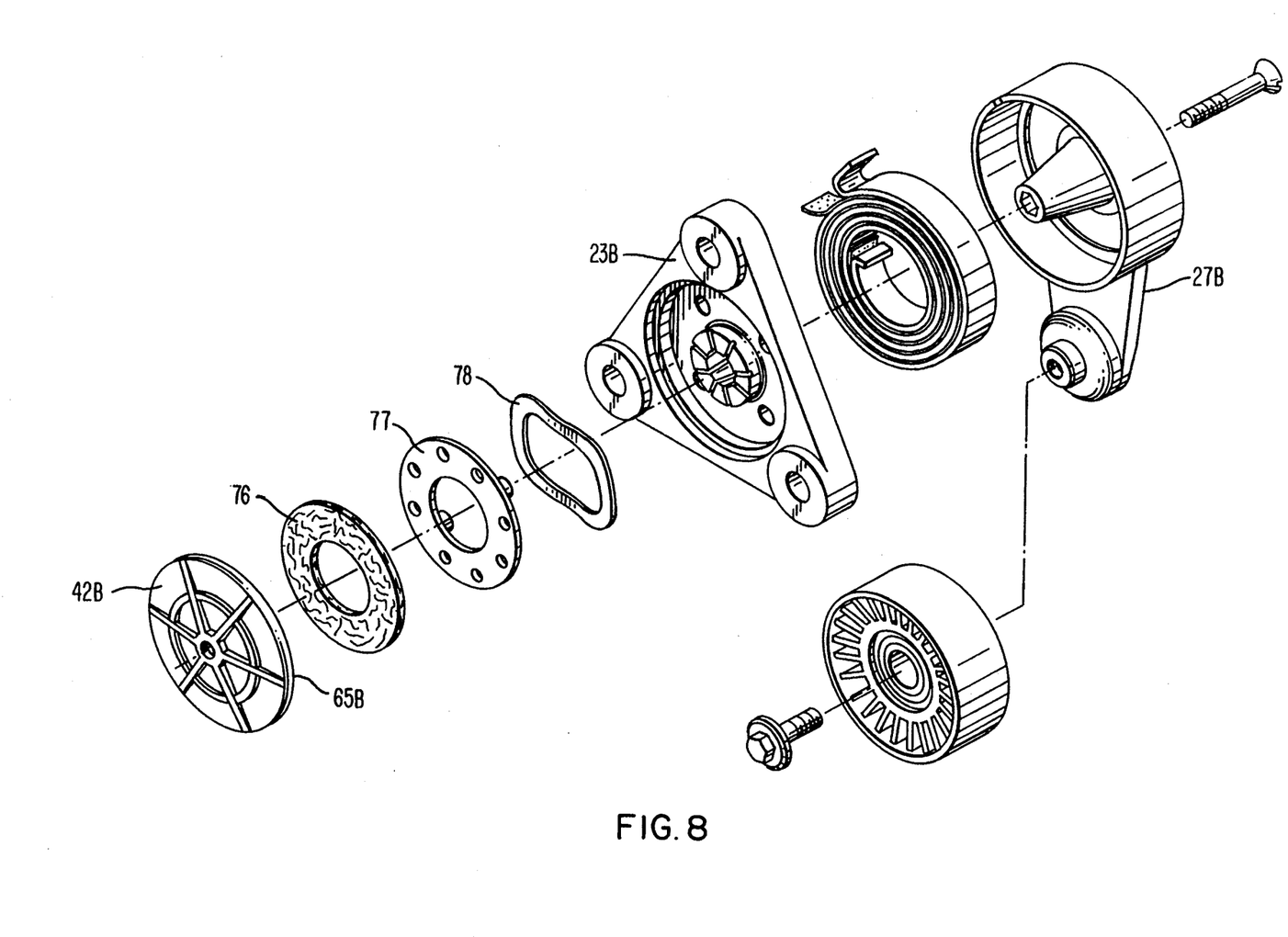
FIG. 8 is an exploded perspective view of the various parts that form the belt tensioner of FIGS. 6 and 7.

For example, reference is now made to FIGS. 6–8 wherein another tensioner of this invention is generally indicated by the reference numeral 22B and parts thereof similar to the parts of the tensioners 22 and 22A previously described are indicated by like reference numerals followed by the reference letter "B".

As illustrated in FIGS. 6–8, the tensioner 22B has the arm plate 42B thereof formed in a manner similar to the arm plates of the aforementioned U.S. patents to Henderson and is provided with an annular friction pad 76 that is urged against the side 65B of the arm plate 42B by an annular member 77 splined to the support member 23B and being urged toward the arm plate 42B by a wavy spring means 78 all in the manner fully set forth in the aforementioned U.S. patents to Henderson whereby the rotary movement of the arm plate 42B in unison with the rotary movement of the belt engaging arm 27B is frictioned dampened by the pad 76 all for the reasons fully set forth in the aforementioned U.S. patents to Henderson.

Thus, a further description of the particular structure and operation of the friction dampening means of the tensioner 22B of this invention is deemed unnecessary and the cooperation between the one-piece polymeric support member 23B and the belt engaging arm 27B and its arm plate 42B is the same as the tensioner 22 previously described whereby a further discussion of the operation of the tensioner 22B is also deemed unnecessary.

Therefore, it can be seen that this invention not only provides a new belt tensioner and new parts for such a belt tensioner, but also this invention provides a new method of making such a belt tensioner and new methods of making such new parts.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a tensioner for a power transmission belt that is adapted to be operated in an endless path, said tensioner comprising a one-piece support member for being fixed relative to said belt, a belt engaging arm movably carried by said support member, and mechanical spring means operatively interconnected to said support member and to said belt engaging arm for urging said belt engaging arm relative to said support member and against said belt with a force to tension said belt, said support member having a pivot opening passing therethrough and having an annular surface disposed substantially concentrically about the longitudinal axis of said pivot opening thereof, said belt engaging arm having a pivot part thereof rotatably disposed in said pivot opening so as to rotate therein, the improvement wherein said support member is formed of polymeric material and wherein said belt engaging arm has an annular surface directly disposed in sliding engagement with said annular surface of said support member.

2. A tensioner as set forth in claim 1 wherein said support member has a hub-like part through which said pivot opening passes, said spring means comprising a spiraled spring having an inner end and an outer end, said inner end of said spring being interconnected to said hub-like part and said outer end of said spring being interconnected to said belt engaging arm.

3. A tensioner as set forth in claim 2 wherein said hub-like part has an outer annular surface about which said spring has spirals thereof disposed whereby said spring has an inner spiral and an outer spiral.

4. A tensioner as set forth in claim 3 wherein said annular surface of said hub-like part has a section thereof set off center so as to provide material under said inner spiral adjacent said inner end of said spring.

5. A tensioner as set forth in claim 2 wherein said belt engaging arm has a cup-shaped portion provided with a closed end and an open end with an annular section therebetween, said annular surface of said belt engaging arm being disposed adjacent said open end thereof.

6. A tensioner as set forth in claim 5 wherein said outer end of said spring is interconnected to said annular section of said belt engaging arm.

7. A tensioner as set forth in claim 1 wherein said support member has opposed sides through which said pivot opening passes, said belt engaging arm being disposed adjacent one of said opposed sides and comprising an arm plate disposed adjacent the other of said opposed sides and being interconnected to said pivot part of said belt engaging arm.

8. A tensioner as set forth in claim 7 wherein said arm plate has opposed sides and has an opening passing therethrough in aligned relation with said pivot opening of said support member, said pivot part of said belt engaging arm having a free end projecting through said opening of said arm plate and being swedged against one of said opposed sides of said arm plate to compact the other of said opposed sides of said arm plate against said support member.

9. A tensioner as set forth in claim 7 wherein said arm plate has opposed sides and has a fastening means disposed in aligned relation with said pivot opening of said support member and interconnecting said arm plate to said pivot part of said belt engaging means in a manner to compact one of said opposed sides of said arm plate against said support member.

10. A tensioner as set forth in claim 7 and comprising frictional dampening means disposed between said arm plate and said support member and being operatively associated therewith to dampen movement of said belt engaging arm relative to said support member.

11. In a method of making a tensioner for a power transmission belt that is adapted to be operated in an endless path, said tensioner comprising a one-piece support member for being fixed relative to said belt, a belt engaging arm movably carried by said support member, and mechanical spring means operatively interconnected to said support member and to said belt engaging arm for urging said belt engaging arm relative to said support member and against said belt with a force to tension said belt, said support member having a pivot opening passing therethrough and having an annular surface disposed substantially concentrically about the longitudinal axis of said pivot opening thereof, said belt engaging arm having a pivot part thereof rotatably disposed in said pivot opening so as to rotate therein, the improvement comprising the steps of forming said support member of polymeric material, and forming said belt engaging arm to have an annular surface directly disposed in sliding engagement with said annular surface of said support member.

12. A method of making a tensioner as set forth in claim 11 and comprising the steps of forming said support member to have a hub-like part through which said pivot opening passes, forming said spring means to comprise a spiraled spring having an inner end and an outer end, and interconnecting said inner end of said spring to said hub-like part and said outer end of said spring to said belt engaging arm.

13. A method of making a tensioner as set forth in claim 12 and comprising the steps of forming said hub-like part to have an outer annular surface about which said spring has spirals thereof disposed whereby said spring has an inner spiral and an outer spiral.

14. A method of making a tensioner as set forth in claim 13 and comprising the steps of forming said annular surface of said hub-like part to have a section thereof set off center so as to provide material under said inner spiral adjacent said inner end of said spring.

15. A method of making a tensioner as set forth in claim 12 and comprising the steps of forming said belt engaging arm to have a cup-shaped portion provided with a closed end and an open end with an annular section therebetween, and forming said annular surface of said belt engaging arm to be disposed adjacent said open end thereof.

16. A method of making a tensioner as set forth in claim 15 and comprising the step of interconnecting said outer end of said spring to said annular section of said belt engaging arm.

17. A method of making a tensioner as set forth in claim 11 and comprising the steps of forming said support member to have opposed sides through which said pivot opening passes, forming said belt engaging arm to be disposed adjacent one of said opposed sides, and forming said belt engaging arm to comprise an arm plate disposed adjacent the other of said opposed sides and being interconnected to said pivot part of said belt engaging arm.

18. A method of making a tensioner as set forth in claim 17 and comprising the steps of forming said arm plate to have opposed sides and to have an opening passing therethrough in aligned relation with said pivot opening of said support member, forming said pivot part of said belt engaging arm to have a free end projecting through said opening of said arm plate, and swedging said free end against one of said opposed sides of said arm plate to compact the other of said opposed sides of said arm plate against said support member.

19. A method of making a tensioner as set forth in claim 17 and comprising the steps of forming said arm plate to have opposed sides, disposing a fastening means in aligned relation with said pivot opening of said support member, and interconnecting said arm plate to said pivot part of said belt engaging means with said fastening means in a manner to compact one of said opposed sides of said arm plate against said support member.

20. A method of making a tensioner as set forth in claim 17 and comprising the step of disposing frictional dampening means between said arm plate and said support member to be operatively associated therewith so as to dampen movement of said belt engaging arm relative to said support member.

* * * * *